United States Patent
Chani et al.

(10) Patent No.: US 10,989,575 B1
(45) Date of Patent: Apr. 27, 2021

(54) MULTIFUNCTIONAL PRESSURE, DISPLACEMENT AND TEMPERATURE GRADIENT SENSOR

(71) Applicant: King Abdulaziz University, Jeddah (SA)

(72) Inventors: Muhammad Tariq Saeed Chani, Jeddah (SA); Abdullah Mohamed Asiri, Jeddah (SA); Khasan Karimov, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/013,899

(22) Filed: Sep. 8, 2020

(51) Int. Cl.
| | |
|---|---|
| *G01D 21/02* | (2006.01) |
| *G01K 7/04* | (2006.01) |
| *G01D 5/16* | (2006.01) |
| *G01L 1/20* | (2006.01) |

(52) U.S. Cl.
CPC ............. *G01D 21/02* (2013.01); *G01D 5/16* (2013.01); *G01K 7/04* (2013.01); *G01L 1/20* (2013.01)

(58) Field of Classification Search
CPC . G01D 21/02; G01D 5/16; G01L 1/20; G01K 7/04
See application file for complete search history.

(56) References Cited

U.S. PATENT DOCUMENTS

| | | | | |
|---|---|---|---|---|
| 2,879,641 | A | | 3/1959 | Johnson |
| 4,606,222 | A | * | 8/1986 | Stockmeyer ....... G01N 27/4162 205/788 |
| 5,068,126 | A | * | 11/1991 | Suzuki .................... H01M 4/00 427/122 |
| 5,399,962 | A | * | 3/1995 | Merchant ........... G01R 29/0842 324/377 |
| 5,451,882 | A | * | 9/1995 | Wakino .............. G01R 27/2688 324/663 |
| 9,651,595 | B2 | * | 5/2017 | Fijalkowski ......... G01N 27/226 |
| 10,302,582 | B2 | * | 5/2019 | Kikuzumi ............ G01N 27/043 |

(Continued)

FOREIGN PATENT DOCUMENTS

| | | |
|---|---|---|
| CN | 103966404 | 8/2014 |
| WO | 2019167709 | 9/2019 |
| WO | 2019171915 | 9/2019 |

OTHER PUBLICATIONS

Ali et al., Pressure Senstivie Sensors Based on Carbon Nanotubes, Graphene, and Its Composites. Journal of Nanomaterials. (Year: 2018).*

(Continued)

*Primary Examiner* — Jonathan M Dunlap
(74) *Attorney, Agent, or Firm* — W & C IP

(57) ABSTRACT

A multifunctional pressure, displacement, and temperature gradient sensor employs powders of one or more of carbon nanotubes (CNTs) or graphene. These powders are placed in a hollow body which has a fixed electrode on one end and moveable electrode on the other. The powders are compressible, and movements of the moveable electrode sliding within the sensor can be accurately detected. Thermocouples on each electrode permit measuring the gradient of temperature for the calibration of the multifunctional sensor and also for the measurement of resistance, thermoelectric voltage and thermoelectric current of the sensor.

9 Claims, 4 Drawing Sheets
(4 of 4 Drawing Sheet(s) Filed in Color)

(56) References Cited

U.S. PATENT DOCUMENTS

| | | | | |
|---|---|---|---|---|
| 2008/0030206 | A1* | 2/2008 | Podhajsky | G01N 27/221 324/663 |
| 2009/0039900 | A1* | 2/2009 | Podhajsky | G01N 27/221 324/663 |
| 2014/0285221 | A1* | 9/2014 | Fijalkowski | G01N 27/026 324/663 |
| 2016/0223482 | A1* | 8/2016 | Delgado | G01N 27/026 |
| 2018/0254236 | A1* | 9/2018 | Cola | C09K 5/14 |
| 2019/0289951 | A1* | 9/2019 | Jo | A43B 3/0005 |
| 2020/0091840 | A1 | 3/2020 | Dhyllon | |
| 2020/0333221 | A1* | 10/2020 | Li | G01N 3/06 |

OTHER PUBLICATIONS

Karimov et al., "Developement of pressure-sensitive thermoelectric cell using graphene and n-Bi2Te3", Emergent Materials, May 15, 2019.

* cited by examiner

US 10,989,575 B1

MULTIFUNCTIONAL PRESSURE, DISPLACEMENT AND TEMPERATURE GRADIENT SENSOR

FIELD OF THE INVENTION

The invention is related to multifunctional sensors, and, more particularly, to sensors which employ carbon nanotubes and/or graphene particles.

BACKGROUND

Yao, *Nanoscale*, 6 (2014) 2345-2352, describe a capacitive-type multifunctional sensor composed of Ecoflex and silver nanowires was developed for the detection of pressure, strain and finger touch.

Multifunctional sensors have also been prepared on the base of silicone hydrogels to detect the pH value of solutions, the types of solvent and the ethanol percentage in water (see, Zhao, *Polymer International*, 66 (2017) 566-572).

Karimov *Emergent Materials* April 2019 describe a cost effective thermo electric pressure sensor. They propose a nanopowder of n-type bismuth telluride, graphene and/or sandwiched between two electrically conductive ITO layers. The pressure sensor is not a multifunctional sensor and requires the use of a ring shaped gasket to hold the powder between the plates.

Making multifunctional sensors which have high precision and low manufacturing costs remains a challenge.

SUMMARY

In an embodiment of the invention, powders made from carbon nanotubes (CNT) or graphene, or a combination of the two (1:1 CNT particle:graphene particle) are employed inside the body of a multifunctional pressure, displacement, and temperature gradient sensor.

Another embodiment of the invention is to provide a low cost and reliable multifunctional pressure, displacement and temperature gradient sensor.

According to embodiments of the invention, a multifunctional pressure, displacement and temperature gradient sensor is fabricated using powders of multiwalled carbon nanotubes (MWCNTs) and graphene. For an exemplary sensor produced according to an embodiment of the invention, the effect of pressure on the resistance, Seebeck coefficient, thermoelectric voltage and current of the sensors was measured by changing pressure from 0 to 1.65 kgf/cm$^2$, while the effect of temperature gradient on the resistance, thermoelectric voltage and current of the sensors was measured up to the temperature gradient of 34-36° C. Dependence of the resistance on longitudinal compressive displacement up to 100 μm was also determined. It was found that the resistance, Seebeck coefficient and thermoelectric voltage of the CNT and graphene powders decreased with increasing pressure, while the thermoelectric current increased with pressure. Moreover, with an increasing temperature gradient and average temperature a considerable increase was observed in thermoelectric current and voltage, while the increase in resistances was moderate. The increase in longitudinal displacement resulted in the compression of the samples that caused a decrease in the resistance of the samples, especially in the case of samples made from both CNT and graphene. Simulation of the experimental results was carried out by using linear functions, and the results of simulations were in good agreement with experimental results.

As is demonstrated herein, this invention presents a novel design of a sensor that can be used as multifunctional sensor. Fabrication of the invented sensor is very easy. The invented sensor is Cost effective and reusable. The invented sensors may be used for the pressure, displacement and gradient of temperature measurements, and they provide for fast and reliable characterization of materials.

DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
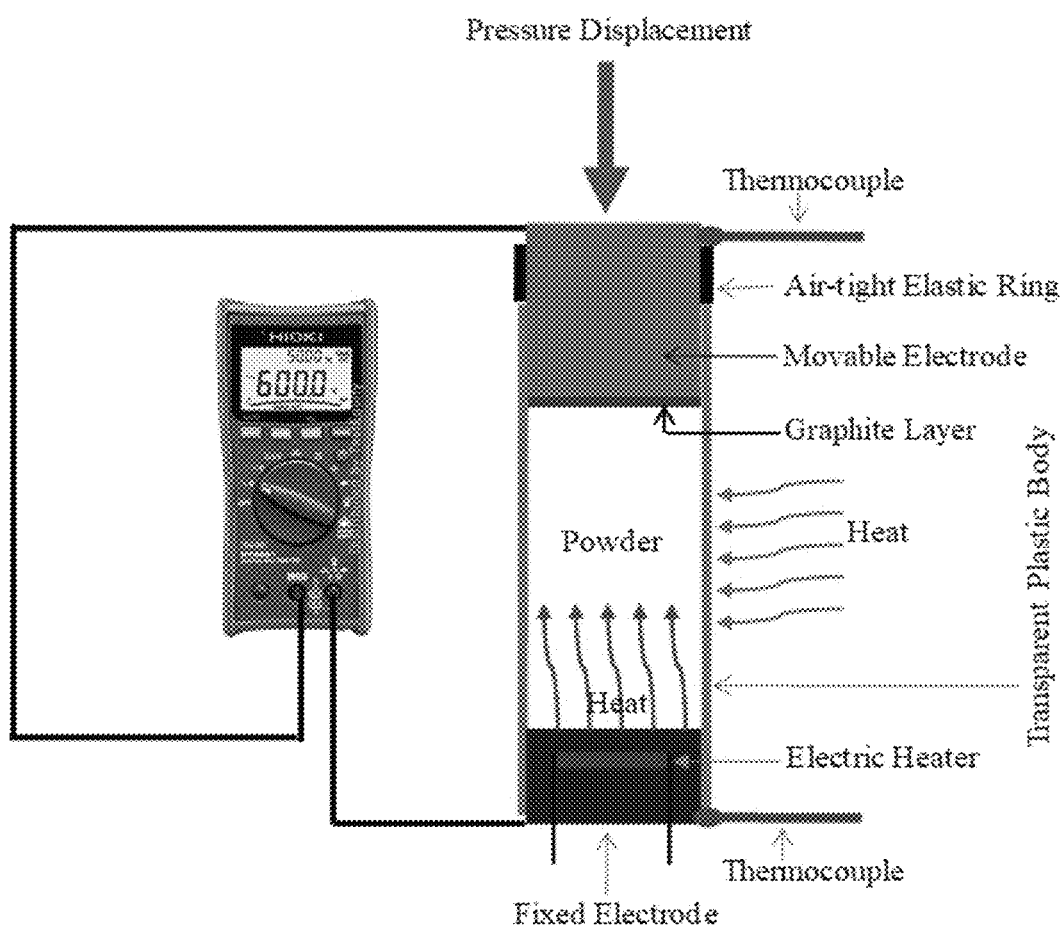
FIG. 1 is a schematic diagram of an example of a multifunctional sensor fabricated according to the invention.

FIG. 1 shows a schematic diagram of one embodiment of a multifunctional sensor fabricated and tested herein. The configuration of the multifunctional sensor may vary depending upon the application it will be used in, the needs of the fabricator, and for other reasons. The main components of a multifunctional sensor according to the invention include the hollow body, the fixed electrode on one end, the moveable electrode on the other end, thermocouples on each electrode, and a powder of CNT, graphene, or a mixture of the two inside the volume of the hollow body as it is bounded by the fixed and moveable electrode.

In FIG. 1, the hollow body is identified as a transparent plastic body, and it is shown in cross-section as a cylinder. An advantage of the cylindrical shape is that plastic tubes are inexpensive to manufacture, and within the context of the present invention, the cylindrical shape is ideal for the moveable electrode to be slidable inward and outward, while maintaining a relatively air tight vessel for the powder contained in the sensor. Other materials, e.g., glass, etc. could be used instead of plastic. In addition, the body could be shaped as square (similar to a cuvette) or some other polygonal design. The main requirement is that the powder stays within the container and fills the volume created by the hollow inside of the body and the electrodes. Having the body be transparent, or at least semi-transparent, permits light energy and heat to pass through the one or more sidewalls of the body such that can interact with the powder (such as for when a temperature gradient is being detected).

The main requirement is that the powder stays within the container and fills the volume created by the hollow inside of the body and the electrodes. This permits electrical communication between the two electrodes through the powder. In addition, to keep the powder in pristine condition, it is desirable that the volume in which the powder is located remain air tight. This can be accomplished using an elastic ring or other device which grips tightly against the moveable electrode and the top end of the hollow body. The function would be to have a device which prevents or at least impedes and reduces air flow through any passage between the moveable electrode and the inside wall of the body. This keeps the powder in good condition for making the measurements described herein. As the moveable electrode can slide in an out of the end of the body, the powder can be removed and changed periodically to keep the sensor in good working order.

The thermocouples on each electrode allow sensing heat in the powder, which can arise when the sensor is receiving significant radiation from the sun or other external source, and/or is being heated by an attached electrical heater. This is accomplished by a measurement between the top and bottom thermocouple through the electrodes, and through the powder. As will be discussed below, the electrical heater is useful for calibrating the sensor. As will be noted from the experiments below the thermoelectric voltage increases as temperature gradient increases, and the thermoelectric current linearly increases as temperature gradient increases. However, the resistance is practically constant as temperature gradient increases.

The movable electrode can move longitudinally downward when a pressure is applied against it (e.g., from above as shown in FIG. 1). This allows pressure and displacement measurements to be performed because the separation between the fixed electrode and the moveable electrode. In order for this to occur, the powder will need to compressible. The CNT particles and/or graphene particles generally have a diameter of 10 nm to 30 nm. For a displacement of 100 μm, these powders allow sufficient compressibility due to spaces between particulates and the nature of the CNTs and graphene materials themselves. The compressibility of the powder is improved by mixing the powder for 10-30 minutes before placing it within the hollow body. In operation, as noted from the studies described below, for the sensor the resistance linearly decreases with increases of the displacement when the sensor is filled by CNT or graphene powder. The resistance decreases considerably, e.g. 2.74 times, as displacement increases up to 100 μm, when the sensor is filled by both CNT (50%) and graphene (50%) powders.

To assure good contact with the powder, the moveable electrode is coated with a layer of graphite. This layer may be 10-20 μm in thickness. Furthermore, to assured good performance, this layer of graphite should be restored periodically between uses.

In the studies set forth below, the powder of carbon nanotubes (CNT) was purchased from Sun Nanotek Co. LTD (sunnano.com), while the graphene powder and the other required materials were purchased from Sigma Aldrich (sigmaaldrich.com). The multifunctional pressure, displacement and gradient temperature sensor which was tested was designed as illustrated in FIG. 1. The tested sensor had a cylindrical body and fixed and the movable electrodes. The length and external diameter of the cylindrical body were 20 mm and 8 mm, respectively. Depending on the application, the length might range from 5 mm to 50 mm, and the external diameter might range from 3 mm to 15 mm, and the internal diameter might range from 2-12 mm in diameter. The diameter of the fixed electrode in the tested sensor was 5 mm while its height is 4 mm. The dimensions of the moveable electrode was 5 mm (diameter) and 8 mm (height). The thermocouples were attached with both the electrodes. The thermocouples are used to measure the gradient of temperature for the calibration of the multifunctional sensor and also for the measurement of resistance, thermoelectric voltage and thermoelectric current of the sensor. For the calibration of the sensor the gradient of temperature is created along the longitudinal axis of the cylindrical body by using a small resistive electric heater that is fixed under the fixed metallic electrode. The elastic rubber ring is used to seal the multifunctional sensor. The compressive displacement is measured by using micrometer as done in Karimov, *Chinese Physics B*20(2011) 040601.

For conducting experiments, the core of the multifunctional sensor was filled with carbon nanotubes or graphene or a mixture of CNTs and graphene (50%:50% by wt.). If mixtures of CNTs and graphene are used, these may vary from 5%:95% by wt., to 95%:5% by wt. The diameter of the multiwalled carbon nanotubes (MWNTs) varies between 10-30 nm. The resistance, open-circuit voltage and short-circuit current was measured using a HIOKI DT 4253 digital multimeter. The temperature was measured by using thermocouples of two UT33C digital meters. The pressure was created by using weights.

Figure 2:
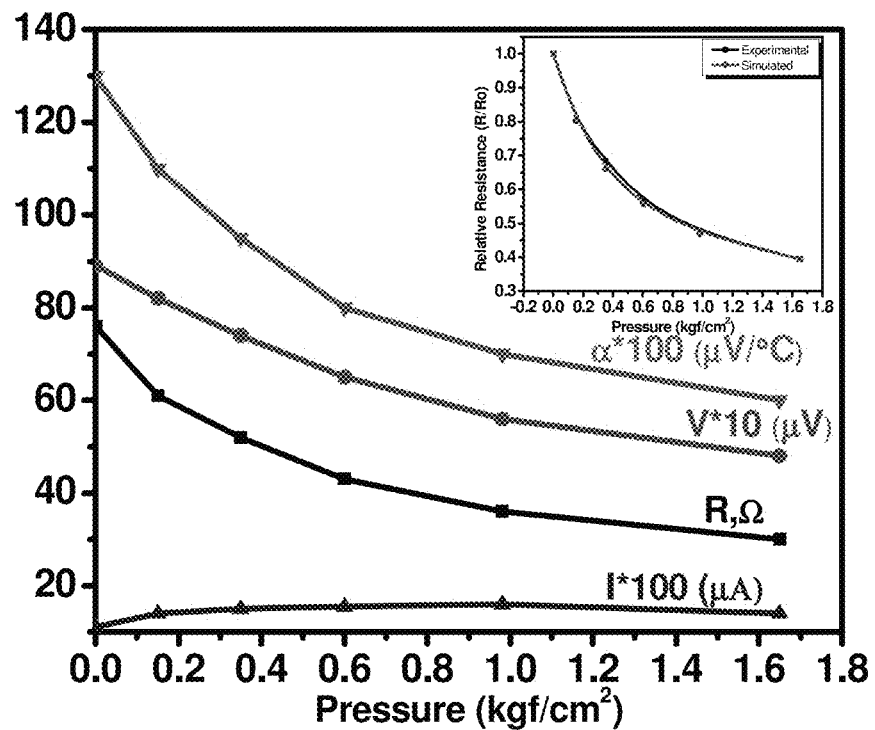
FIG. 2 is a graph showing the dependence of the resistance, thermoelectric voltage, thermoelectric current and Seebeck coefficient of graphene powder on the applied pressure for the exemplary sensor of FIG. 1, and wherein the inset shows the comparison of experimental and simulated results.
Figure 3:
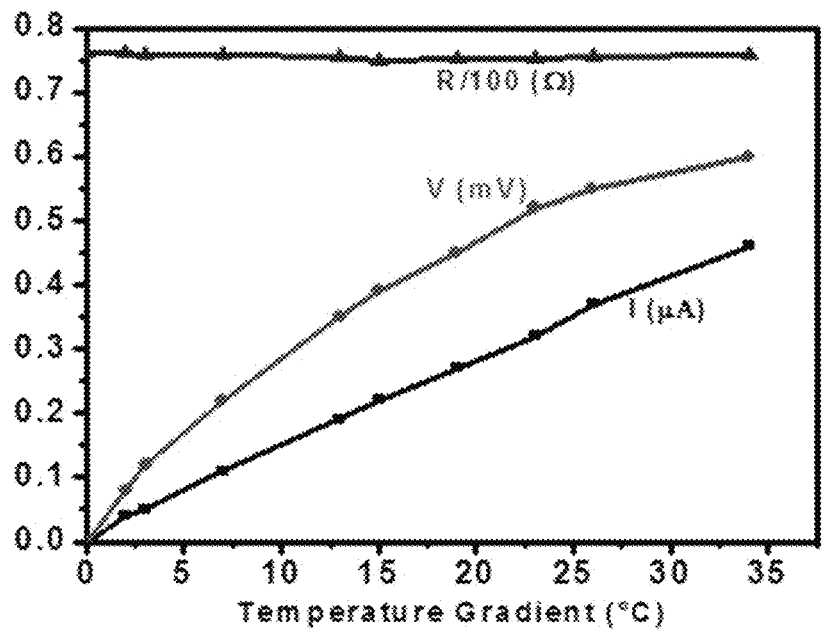
FIG. 3 is a graph showing the dependences of the resistance, thermoelectric voltage and thermoelectric current of graphene powder on the gradient of temperature for the exemplary sensor of FIG. 1.

FIG. 2 shows the dependence of resistance, thermoelectric voltage, thermoelectric current and the Seebeck coefficient on pressure (in the range of 0.0 to 1.65 kgf cm$^{-2}$) for the pristine graphene powder at a fixed gradient of temperature (8° C.). It can be seen from FIG. 2 that resistance, thermoelectric voltage, and the Seebeck coefficient decreased by 2.53, 1.85 and 2.17 times with increases of the applied pressure at a fixed gradient of temperature. The thermoelectric current increased by 1.27 times with increases in pressure. FIG. 3 shows the dependence of resistance, thermoelectric voltage and thermoelectric current of graphene on the gradient of temperature at zero pressure. From FIG. 3, it may be seen that with increase in temperature gradient up to 34° C. the resistance is practically constant on average at 76Ω, the thermoelectric voltage increases non-linearly up to 0.6 mV, and the thermoelectric current increases generally linearly up to 0.46 μA.

Figure 4:
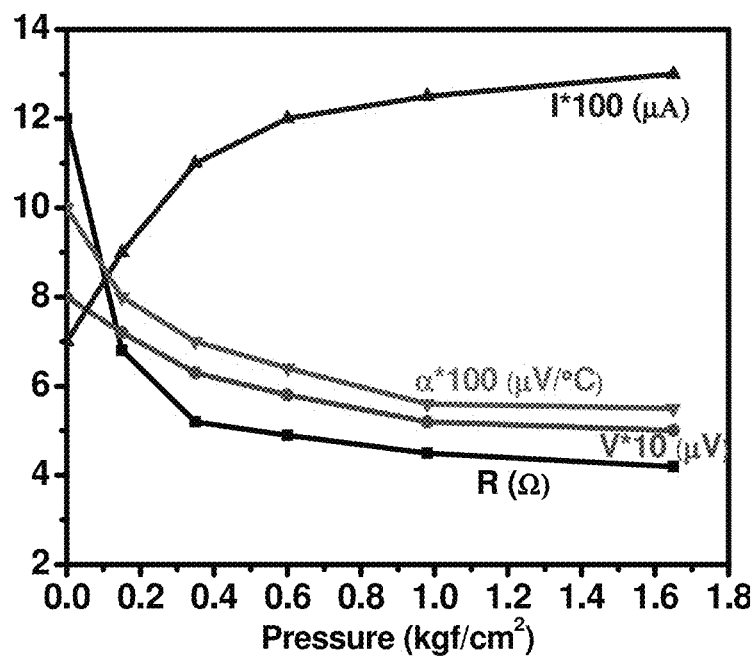
FIG. 4 is a graph showing the dependence of the resistance, thermoelectric voltage, thermoelectric current and Seebeck coefficient of CNTs powder on the applied pressure for the exemplary sensor of FIG. 1.
Figure 5:
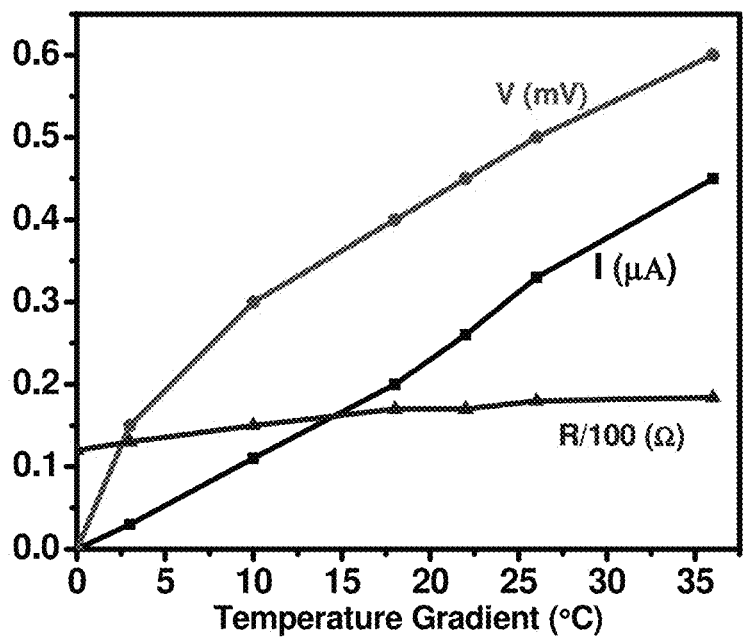
FIG. 5 is a graph showing the dependence of the resistance, thermoelectric voltage and thermoelectric current of CNTs powder on the gradient of temperature for the exemplary sensor of FIG. 1.

The results of the investigation of CNs powder are shown in FIGS. 4 and 5, which are similar to the experimental graphs obtained with graphene powder (FIGS. 2 and 3). In FIG. 4, on increasing pressure at fixed gradient of temperature (8° C.), the resistance, thermoelectric voltage and Seebeck coefficient of the CNTs decreased by 2.86, 1.60 and 1.82 times, respectively, while the thermoelectric current increased by 1.82 times. FIG. 5 shows the dependence of the resistance, thermoelectric voltage and thermoelectric current of CNTs on the gradient of temperature at zero pressure. It can be seen that upon increasing temperature gradient up to 36° C. the resistance increases by 1.53 times on average 15Ω and the thermoelectric voltage increases up to 0.6 mV (non-linearly), while, the thermoelectric current linearly increases up to 0.45 μA.

Figure 6:
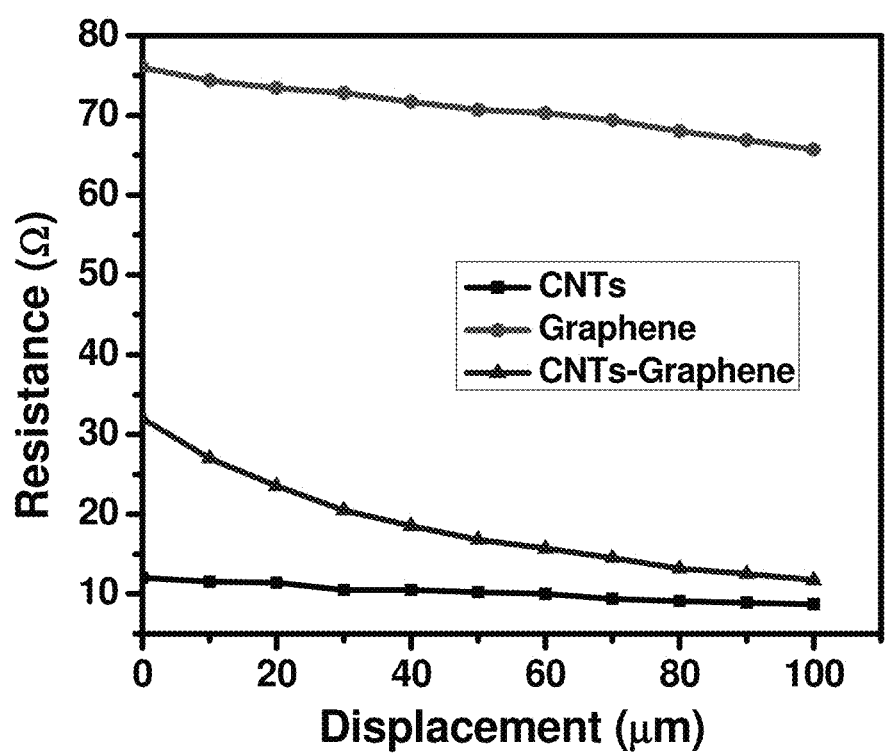
FIG. 6 is a graph showing the resistance-displacement relationships for the CNTs, graphene and the CNTs-graphene mixture samples.

FIG. 6 shows resistance-displacement relationships for the samples of CNTs, graphene and CNTs-graphene mixture. At compressive displacement up to 100 μm the resistance decreased by 1.16 times and 1.38 times, respectively for graphene and CNT samples. From the resistance-displacement relationship of CNT-graphene mixture (1:1 by wt.) it is evident that the 100 µm compressive displacement causes the resistance to decrease by 2.74 times.

The obtained results show that the multifunctional sensor will provide for fast and reliable characterization of pressure, displacement and temperature gradient. Furthermore, fabrication of the sensor is easy and cost effective. In addition, the sensor is reusable.

Not to be bound by theory, the observed performance of the sensor can be explained in the following way. Under pressure the contact and the bulk resistances of the CNT or graphene particles may be decreased, and this will cause a decrease in the total resistance of the sample. It is well known that the CNT and graphene structures are different: when the graphene sheets are rolled up into cylinders, they convert into carbon nanotubes (CNTs). The cylinders diameter can be varied from 0.6 to about 3 nm The CNTs can be either metallic with no band gap or semiconducting with a distinct band gap that depends on the direction along which the graphene sheets are rolled up. The CNTs showed high mechanical and thermal stability and high thermal conductivity. The metallic CNTs have been identified as possible interconnect material of future technology generations and potentially can replace aluminum Al and Cu interconnects (see Ratchowhury *IEEE Transaction on Computer Aided Design of Integrated Circuits and Systems* (2006) 25:58-65. The single-particle band structure of graphene was described in Suzuki *J. Modern Physics* (2017) 8:607, Geim *Nature Materials* (2007) 6:183, Neto *Reviews of Modern Physics* (2009) 81:109, and Sarma *Reviews of Modern Physics* (2011) 83:407. The electronic band structure of graphene based on the rectangular 4-atom unit cell was developed in Suzuki ibid.

In order to explain electrical conduction in graphene and carbon nanotubes the following expression was used (see Fujita "Electrical Conduction in Graphene and Nanotubes" John Wiley & Sons 2013):

$$\sigma = n\ e^2 \tau/m \quad (1)$$

where $\sigma$, n, e, $\tau$ and m are conductivity, concentration of charges, electron charge, mean free time and mass of electron, respectively. Under the effect of pressure (see FIGS. 2 and 4) the resistance of the graphene and CNT samples decreases, which can be explained by the increase of the mean free time of electrons and accordingly by the decrease of the internal particles' resistances. Moreover, the interparticle contact resistances may also be decreased under effect of the pressure. Accordingly, these effects may cause increases in the thermoelectric current and decrease the thermoelectric voltage and Seebeck coefficient that were observed experimentally in FIGS. 2 and 4. The decrease in Seebeck coefficient with increases in hydrostatic pressure was observed in highly conductive quasi-one-dimensional crystals of tetrathiotetracene-tetracyanoquinodimethane $\{(TTT)-(TCNQ)_2\}$ and N-methylquinolinium-tetracyanoquinodimethane $\{(NMe)-(TCNQ)_2\}$ (see Karimov D.Sc. Thesis, Department of Heat Physics, Academy of Sciences, Tashkent, Uzbekistan (1994) 1:994. All these experimental results usually confirm the well-known phenomenon that the increase of conductivity of the materials due to effect of the pressure usually results in the decrease of Seebeck coefficient as we also observed in the case of CNT and graphene. The thermoelectric effect actually may be observed due to three reasons: contact thermoelectric effect due to dependence of Fermi levels of two contact materials on temperature, volume thermoelectric effect due to dependence of average velocity and concentration (in the case of the semiconductors) of materials from temperature and phonon drags of electrons in nano-carbon and in graphite.

The experimental results can be simulated by applying the following exponential function:

$$f(x) = e^x \quad (2)$$

For the relative resistance-pressure relationship the above function can be modified as:

$$R/R_0 = e^{k\Delta p(3p_m/2p+p_m)} \quad (3)$$

Where, p is instantaneous pressure, $\Delta p$ is change in pressure, $p_m$ is a maximum pressure and k is the resistance pressure constant. The value of k is calculated as 0.563 $(kgf/cm^2)^{-1}$ at maximum pressure. The comparison of experimental and simulated results is shown in inset of FIG. 2. It can be seen that the experimental and simulated results are well matched. The other experimental results can also be simulated by applying the same mathematical function.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention claimed is:

1. A multifunctional pressure, displacement, and temperature gradient sensor, comprising:
   a hollow body comprised of one or more side walls, wherein said hollow body has a first and a second end;
   a fixed electrode fixed on the first end of the hollow body;
   a moveable electrode at the second end of the hollow body slideable longitudinally in the hollow body toward the fixed electrode, wherein the fixed electrode, the moveable electrode, and the hollow body define a volume of variable size within said hollow body between said fixed electrode and said moveable electrode;
   first and second thermocouples respectively connected to the fixed electrode at the first end of the hollow body and the moveable electrode at the second end of the hollow body; and
   a compressible powder comprised of one or more of carbon nanotubes and graphene filling the volume of variable size within said hollow body between said fixed electrode and said moveable electrode,
   wherein the sensor provides a measurement of pressure, longitudinal compressive displacement, and temperature gradient.

2. The multifunctional pressure, displacement, and temperature gradient sensor of claim 1 wherein said hollow body is a hollow cylinder.

3. The multifunctional pressure, displacement, and temperature gradient sensor of claim 1 wherein the one or more side walls of the hollow body are composed of a transparent plastic.

4. The multifunctional pressure, displacement, and temperature gradient sensor of claim 1 further comprising an elastic ring adjacent the second end of the hollow body and the moveable electrode, wherein the elastic ring prevents or reduces air from entering or exiting the hollow body between the hollow body and the moveable electrode.

5. The moveable multifunctional pressure, displacement, and temperature gradient sensor of claim 1 further comprising a layer of graphite on a surface of the moveable electrode facing the powder.

6. The moveable multifunctional pressure, displacement, and temperature gradient sensor of claim 1 further comprising an electric heater associated with one of said first or second electrodes and configured to apply heat to the powder.

7. The moveable multifunctional pressure, displacement, and temperature gradient sensor of claim 1 wherein the powder is comprised of carbon nanotubes.

8. The moveable multifunctional pressure, displacement, and temperature gradient sensor of claim 1 wherein the powder is comprised of graphene.

9. The moveable multifunctional pressure, displacement, and temperature gradient sensor of claim 1 wherein the powder is comprised of a mixture of carbon nanotubes and graphene.

* * * * *